United States Patent
Cho et al.

(10) Patent No.: US 8,411,946 B2
(45) Date of Patent: Apr. 2, 2013

(54) COLOR CONVERSION SYSTEM AND METHOD

(75) Inventors: Maeng-Sub Cho, Daejeon (KR); Jin-Seo Kim, Daejeon (KR); Bonki Koo, Daejeon (KR); Soon-Young Kwon, Daegu (KR); Juyeon You, Daegu (KR); Ki-Hong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 202 days.

(21) Appl. No.: 12/836,043

(22) Filed: Jul. 14, 2010

(65) Prior Publication Data

US 2011/0052055 A1    Mar. 3, 2011

(30) Foreign Application Priority Data

Aug. 28, 2009  (KR) .......................... 10-2009-0080515
Dec. 21, 2009  (KR) .......................... 10-2009-0128507

(51) Int. Cl.
*G06K 9/00*    (2006.01)
(52) U.S. Cl. ...................................... 382/167
(58) Field of Classification Search .................... 382/167
See application file for complete search history.

(56) References Cited

U.S. PATENT DOCUMENTS

| D265,486 S | 7/1982 | Lundell et al. |
| 5,179,437 A * | 1/1993 | Kawada et al. ............... 348/188 |
| 5,331,441 A * | 7/1994 | Akuzawa et al. ............. 358/530 |
| 5,917,987 A * | 6/1999 | Neyman ........................ 386/248 |
| 6,864,915 B1 | 3/2005 | Guimaraes et al. |
| 7,271,933 B2 * | 9/2007 | Kato et al. ..................... 358/1.9 |
| 7,408,573 B2 * | 8/2008 | Ishii et al. .................. 348/223.1 |
| 2012/0069175 A1 * | 3/2012 | Loeffler et al. ............... 348/104 |

FOREIGN PATENT DOCUMENTS

| JP | 5-103336 | 4/1993 |
| JP | 2008-236672 | 10/2008 |
| KR | 10-2002-0088645 A | 11/2002 |
| KR | 10-2007-0055925 A | 5/2007 |

OTHER PUBLICATIONS

Eun-Su Kim et al., "Color Correction Method of CIS Digital Camera for Mobile Phone", The Institute of Electronics Engineers of Korea, vol. 43, No. 4, pp. 307-316, Jul. 2006.

* cited by examiner

*Primary Examiner* — Samir Ahmed
(74) *Attorney, Agent, or Firm* — Kile Park Reed & Houtteman PLLC

(57) ABSTRACT

Provided is a color conversion system and method. The color conversion system which converts the color of a filmed image includes: an image separation unit configured to receive a reference image including a color reference table and an action image, and separate the reference and action images from each other; a color data extraction unit configured to output color values of the color reference table included in the reference image; a control unit configured to detect change values obtained by comparing color values included in the reference image with those included in the color reference table, and generate a look-up table for converting the colors of the color reference table included in the reference image into desired colors; and an image conversion unit configured to perform color correction by converting the color values of the action image into coordinates in pixels, using the look-up table outputted from the control unit.

13 Claims, 6 Drawing Sheets

310 320 330 340 350 360

COLOR CONVERSION SYSTEM AND METHOD

CROSS-REFERENCE(S) TO RELATED APPLICATIONS

The present application claims priority of Korean Patent Application Nos. 10-2009-0080515 and 10-2009-0128507, filed on Aug. 28, 2009, and Dec. 21, 2009, respectively, which are incorporated herein by reference in their entirety.

BACKGROUND OF THE INVENTION

1. Field of the Invention

Exemplary embodiments of the present invention relate to a color conversion system and method; and, more particularly, to a color conversion system and method for converting the color of a filmed image.

2. Description of Related Art

In general, as digital cameras come into wide use, a method of correcting a picture filmed by a digital camera has been widely used. In order to correct such a picture filmed by a digital camera, a variety of programs for correcting the filmed picture in a personal computer (PC) may be used to correct the picture into a form desired by a user.

Meanwhile, digital technologies are combined into various forms in the movie industry. For example, digital cameras may be used to produce a movie, and a variety of special effects using computers may be used.

Such a movie may be filmed over a few months or years, and the filming may be performed in various forms. When a movie is filmed, various scenes and cuts are created, and then organized into one movie. When a movie is filmed in such a manner, identical or similar scenes or cuts may be filmed. In this case, the scenes or cuts may have a different feeling or degenerated into forms which are not desired by a director, due to a difference in sunlight depending on times, even when the same lighting and camera are used.

Similar problems may occur in a TV program production process and commercial filming as well as the movie filming. Therefore, movie directors, commercial directors, or TV producers may often encounter a case in which produced images should be corrected. That is, when a color image filmed by a camera needs to be corrected in the process of film production, commercial filming, or TV program production, the color image is stored in a computer of a studio, and the color thereof is then corrected in an editing process.

However, when such a color correction process is performed, the directors should rely only on their own sights. Therefore, it is difficult to perform the color correction with precision. Furthermore, when the respective scenes are filmed, only scene information written on a clapper board is filmed on a filming set, and color information which may be utilized as a reference of color correction in the future is not filmed. As such, when the color information utilized as a reference is not provided, the color of a filmed image may be changed into a color irrelevant to images filmed by other cameras during the color correction process, due to a lighting environment of the filming set or different color characteristics of the cameras.

As described above, when the respective filmed images are corrected, the correction should rely only on the sights of the directors. Therefore, an enormous amount of manual work is required. Furthermore, it is impossible to accurately reproduce colors which coincide with lightings of the filming set or cameras having different color characteristics.

SUMMARY OF THE INVENTION

An embodiment of the present invention is directed to a system and method which easily converts a filmed image into a desired color.

Another embodiment of the present invention is directed to a system and method which accurately corrects a filmed image into a desired color.

Another embodiment of the present invention is directed to a system and method which performs color correction such that images filmed by cameras having different characteristics are converted into images filmed by a camera having one characteristic.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, an color conversion system which converts the color of a filmed image includes: an image separation unit configured to receive a reference image including a color reference table and an action image, and separate the reference image and the action image from each other; a color data extraction unit configured to output color values of the color reference table included in the reference image; a control unit configured to detect change values obtained by comparing color values included in the reference image with the color values included in the color reference table, and generate a look-up table for converting the colors of the color reference table included in the reference image into desired colors; and an image conversion unit configured to perform color correction by converting the color values of the action image into coordinates in pixels, using the look-up table outputted from the control unit.

In accordance with another embodiment of the present invention, a color conversion method for converting the color of a filmed image includes: receiving a reference image including a color reference table and an action image, and separating the reference image and the action image from each other; outputting color information of the color reference table included in the reference image; detecting a change degree by comparing the color information included in the reference image with previously provided original colors; receiving information which requests the color conversion of the action image, and applying the received information to the change degree to generate a look-up table for the color conversion; and performing color correction by converting the colors of the action image into coordinates in pixels using the look-up table.

DESCRIPTION OF SPECIFIC EMBODIMENTS

Figure 1:
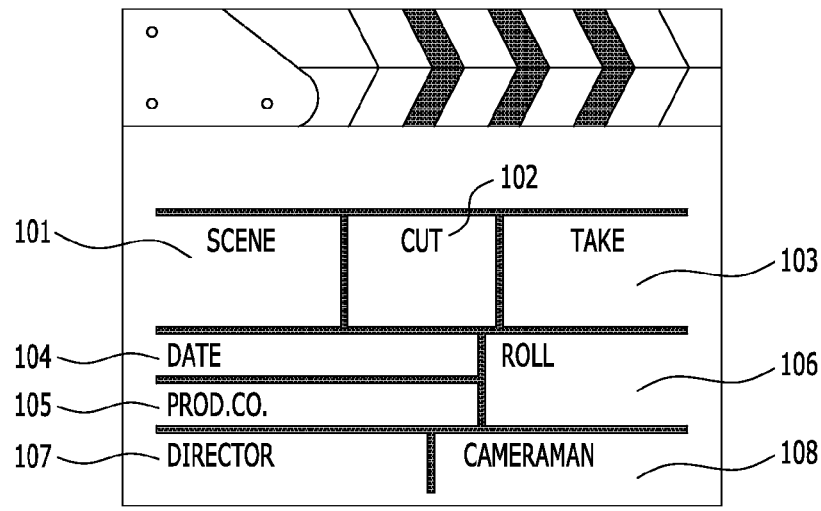
FIG. 1 is a diagram illustrating a clapper board which is generally used for filming a movie, a commercial, or a TV program.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

First, embodiments of the present invention will be described briefly. In the embodiments of the present invention, images are filmed by using a clapper board having a color reference table. Then, the colors of the color reference table included in the clapper board are used to correct the colors of the filmed images using a computer or the like. In this case, the color correction may be applied to all images filmed by different digital cameras, different analog cameras, or a combination of digital and analog cameras.

A color conversion system in accordance with an embodiment of the present invention performs the following operations.

First, the color conversion system converts the color of an image filmed with the color reference table into a color which coincides with a lighting environment desired by a user, utilizing color information measured from the color reference table under a specific lighting.

Second, when the manufacturing companies or models of cameras are different from each other, the cameras may have different color characteristics. Therefore, the color conversion system converts the color of an image filmed by an arbitrary specific camera into a color which coincides with the color characteristic of a camera desired by a user.

Third, the color conversion system converts the color of an image filmed with the color reference table into a color desired by a director or producer by controlling the color, brightness, and chroma of the image.

Fourth, the color conversion system automatically converts the color of an image filmed at a point of time B into the color of the image filmed at a point of time A.

In the embodiments of the present invention, a clapper board and a color reference table are sequentially filmed, just before an action scene is filmed. The filmed image is stored in a computer of a studio. The stored image is separated into a reference image and the action image. The color reference image and the action image, which are separated and stored, are displayed on a monitor screen. Subsequently, color data are extracted from a reference table imaging unit.

A difference between the reference image filmed by a user and a previously-stored color and color information desired by the user are inputted. The color data are converted into the Commission Internationale de l'Eclairage (CIE) 1976 L*a*b* color space, and a three-dimensional look-up table for the converted data is generated. The generated look-up table is applied to the action image stored in an action image storage unit to coordinate-convert the action image. Then, the coordinate-converted action image is stored in a converted image storage unit.

Now, a clapper board which is generally used when a movie, a commercial, a TV program is filmed will be described with reference to FIG. 1.

Referring to FIG. 1, the clapper board 100 includes an area 101 into which a scene number is written, an area 102 into which a cut number is written, an area 103 into which a take number is written, an area 104 into which a date is written, an area 105 into which the name of a producer is written, an area 106 into which a roll number is written, an area into which the name of a director is written, and an area 108 into which the name of a camera man is written. Such areas are used for writing elements required for filming. If necessary, only some areas may be filled out.

The clapper board 100 illustrated in FIG. 1 is not manufactured in such a type that colors can be checked. The color of the clapper board 100 consists of only black and white. Therefore, it is difficult to check changes in color, illuminance, and brightness caused by lightings or natural light and changes in color, illuminance, and brightness depending on the characteristics of cameras. Therefore, the embodiments of the present invention propose a clapper board as illustrated in FIG. 2.

Figure 2:
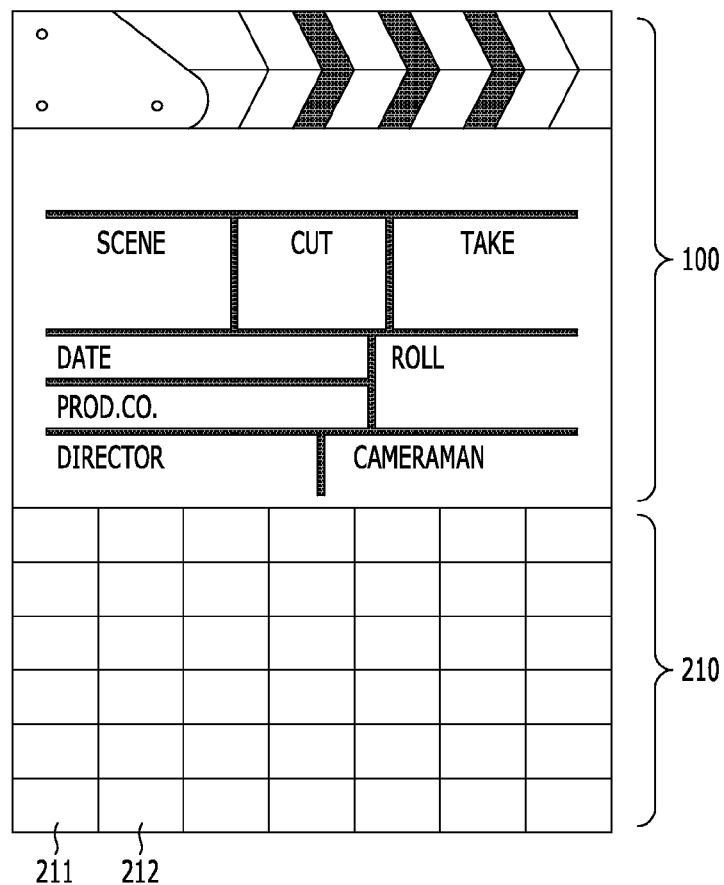
FIG. 2 is a diagram illustrating a clapper board in accordance with an embodiment of the present invention.

FIG. 2 is a diagram illustrating a clapper board in accordance with the embodiment of the present invention.

The clapper board 200 in accordance with the embodiment of the present invention further includes a color reference table 210 provided in a lower side thereof, different from the clapper board 100 which is generally used. The color reference table 210 has several lines of reference colors, and a portion 211 or 212 of each line corresponds to one color. The color reference table provided in the clapper board 200 of FIG. 2 is attached to the lower side of the clapper board 200, but may be attached to an upper side or the left or right side of the clapper board 200. That is, the color reference table may be attached to any one of empty spaces of the clapper board 200. In other words, the clapper board 200 in accordance with the embodiment of the present invention may be implemented by adding the color reference table 200 to the general clapper board 100.

Figure 3:
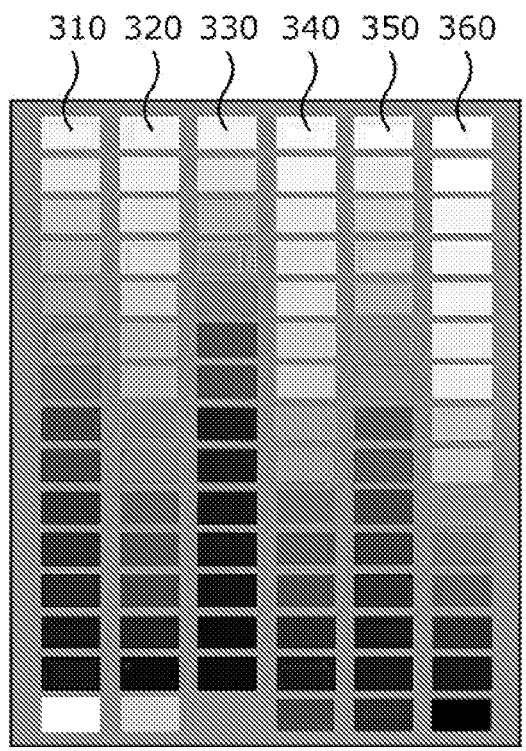
FIG. 3 is a diagram showing an example of a color reference table in accordance with the embodiment of the present invention.

FIG. 3 is a diagram showing an example of the color reference table in accordance with the embodiment of the present invention.

In FIG. 3, each of lines 310 to 360 shows changes in a predetermined color. For example, white is positioned at the lowermost side of the first line 310, and black is positioned at the lowermost side of the last line 360. Furthermore, the first line 310 shows changes in red-based color, the second line 320 shows changes in yellow green-based color, the third line 330 shows changes in blue-based color, the fourth line 340 shows changes in sky-blue-based color, the fifth line 350 shows changes in purple-based color, and the last line 360 shows changes in yellow-based color. The color reference table in accordance with the embodiment of the present invention may include colors through which changes depending on colors, lightings, and characteristics of cameras may be detected. The composition of the color reference table is not limited to six lines. If necessary, the color reference table may have a smaller or larger number of color lines, and each of the lines may include a smaller or larger number of scales.

Figure 4:
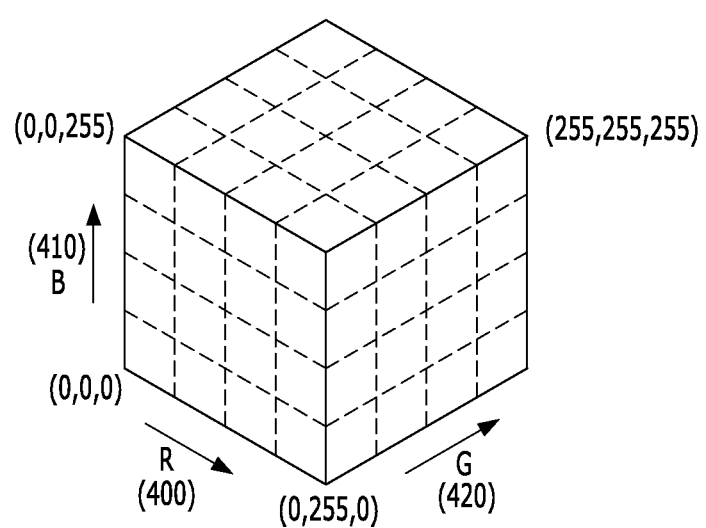
FIG. 4 is a diagram illustrating a three-dimensional look-up table of the color reference table in accordance with the embodiment of the present invention.

FIG. 4 is a diagram illustrating a three-dimensional look-up table of the color reference table in accordance with the embodiment of the present invention.

In FIG. 4, reference numeral 400 indicates a direction showing changes in red, and symbol R represents red. Reference numeral 410 indicates a direction showing changes in blue, and symbol B represents blue. Reference numeral 420 indicates a direction showing changes in green, and symbol G represents green. Those colors are the three primary colors of light. The color changes may be checked on the coordinates by combinations of the respective lights.

An example in which the color changes are measured in coordinates will be described with reference FIG. 5.

Figure 5:
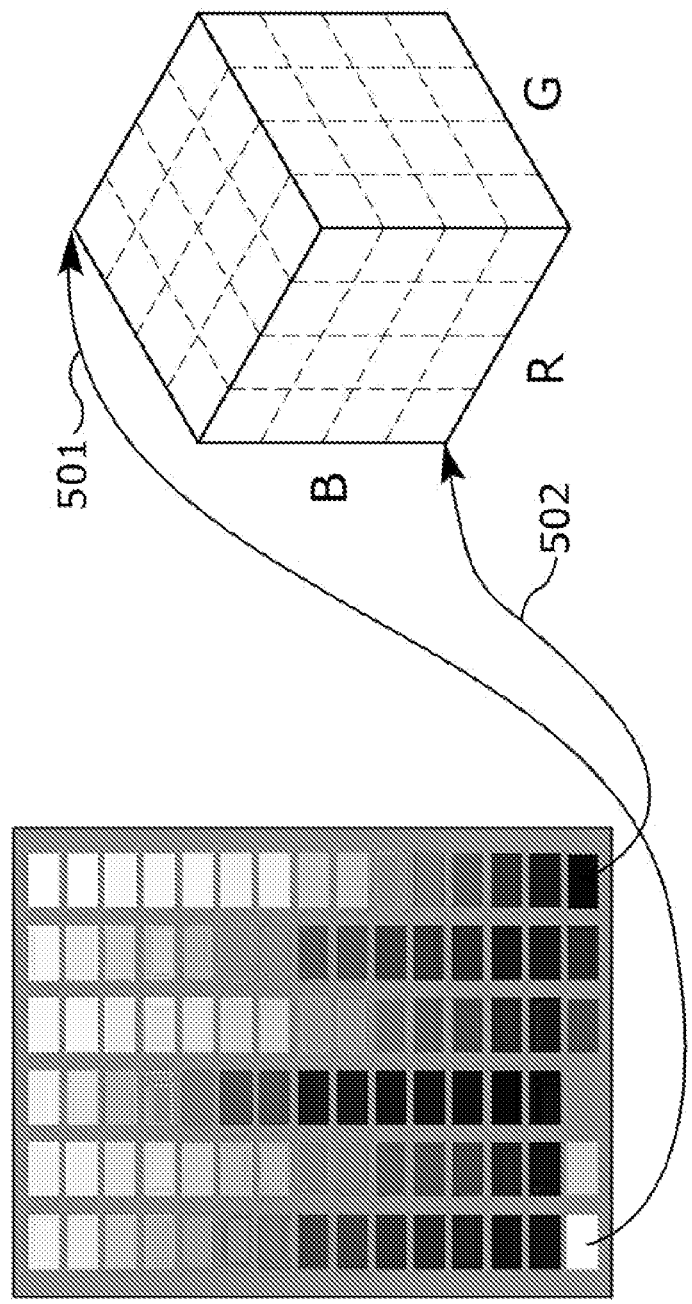
FIG. 5 is a diagram explaining an example in which the color reference table of FIG. 3 is mapped into the three-dimensional look-up table of FIG. 4.

FIG. 5 is a diagram explaining an example in which the color reference table of FIG. 3 is mapped into the three-dimensional look-up table of FIG. 4.

The colors of the above-described color reference table of FIG. 3 may be mapped into the three-dimensional look-up table illustrated in FIG. 4. The look-up table of FIG. 4 will be described in more detail using coordinates which are not yet described. In FIG. 4, a coordinate (0, 0, 0) represents block. That is, mapping is performed as indicated by reference numeral 502 of FIG. 5. This shows a case in which R, G, and B have no value in FIG. 4. When all of R, G, and B have a value, white is formed. Therefore, a coordinate (255, 255, 255) in FIG. 4 represents white. The coordinate conversion may be performed as indicated by reference numeral 501. Therefore, the respective colors illustrated in FIG. 3 have specific R, G, and B values, which may be mapped into the coordinates of FIG. 4.

In FIG. 4, each axis is divided into 256 coordinates, which means $2^8$, when they are expressed as binary numbers to facilitate the detection of digital changes. If necessary, however, a larger or smaller number of coordinates may be used.

Now, the configuration of the color conversion system in accordance with the embodiment of the present invention will be described with reference to the drawings.

In the embodiment of the present invention, each image includes a scene filmed by using the clapper board 200 having the above-described color reference table.

Figure 6:
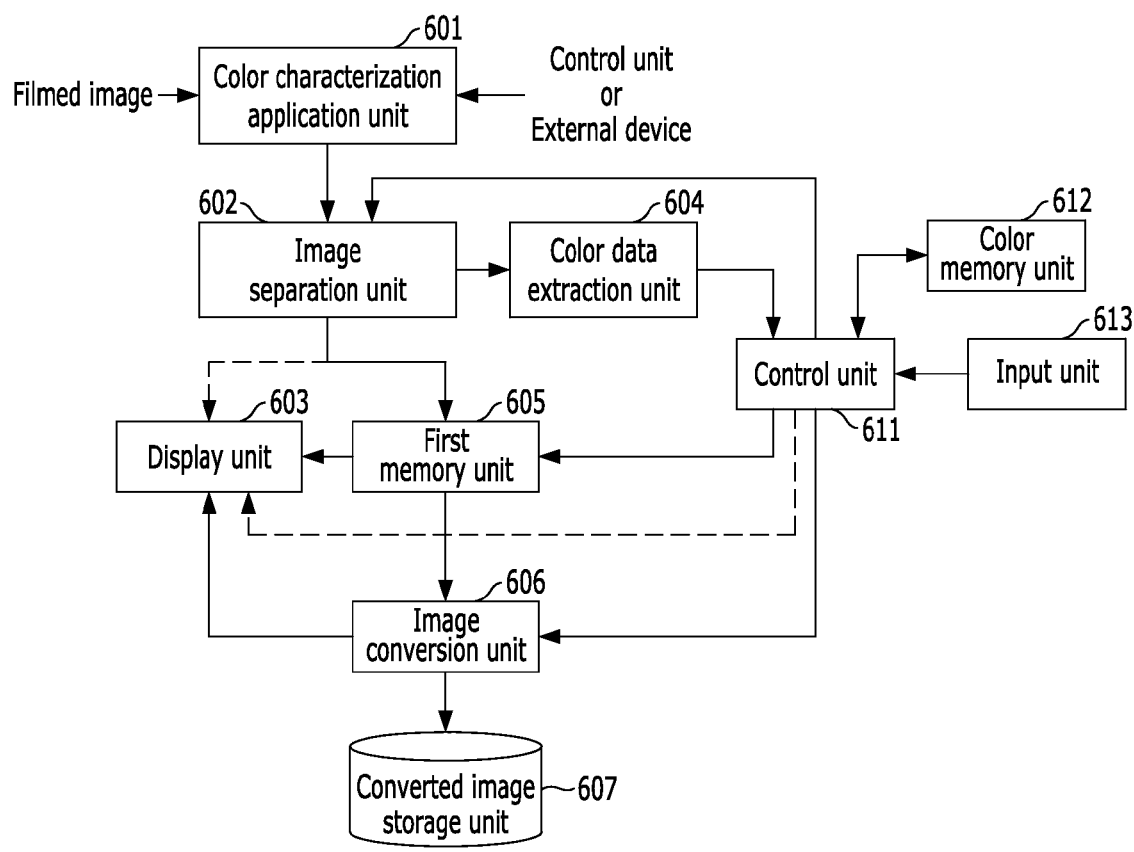
FIG. 6 is a configuration diagram of a color conversion system in accordance with the embodiment of the present invention.

FIG. 6 is a configuration diagram of the color conversion system in accordance with the embodiment of the present invention.

An image which is filmed by a camera in a state in which the clapper board 200 having the color reference table in accordance with the embodiment of the present invention is included in the beginning of the image is inputted to a color characterization application unit 601. The color characterization application unit 601 is configured to convert a color characteristic such that the color characteristic coincides with the characteristic of a camera filming the image or another camera. The conversion of the color characterization application unit 601 may be applied to all images, and may be applied to a first inputted image such that the first inputted image have no characteristic. Furthermore, the color characterization application unit 601 may receive a value for correcting the inputted image such that the color of the image may be accurately expressed depending on the characteristic of a monitor on which the image is displayed. That is, a value for correcting the change degree of a specific color depending on the characteristic of the monitor may be set. As such, the color characterization application unit 601 may apply a different color correction value depending on the color characteristic of a camera and/or the characteristic of a monitor.

The image, of which the color is corrected by the color characterization application unit 601 or is not corrected, is inputted to an image separation unit 602. The image separation unit 602 separates the image into an image part in which the clapper board 200 is filmed and an image part which is actually necessary. The separation of the image separation unit 602 may be performed mechanically or performed while a user sequentially reviewing the inputted image. When the image is mechanically separated, the image may be separated into an image in which a predetermined form (for example, the clapper board in accordance with the embodiment of the present invention) appears for a predetermined time (for example, two to ten seconds) and an image in which the predetermined form does not appear, using the change degree of the images. That is, the image is separated into an image to be used for a movie, a commercial, or a TV program and an image including the clapper board 200 by the image separation unit 602. Hereafter, the image to be used for a movie, a commercial, or a TV program is referred to as an action image, and the image including the clapper board 200 in accordance with the embodiment of the present invention is referred to as a reference image.

The reference image between the images separated by the image separation unit 602 is inputted to a color data extraction unit 604, and the action image is inputted to a first memory unit 605.

At this time, two or more action images may be inputted to the first memory unit 605. The respective action images may be images filmed by one camera or different cameras. Among the respective action images stored in the first memory unit 605, one action image or two or more action images may be displayed on a display unit 603 in accordance with the control of a control unit 611 which will be described below.

The color data extraction 604 is configured to convert the color information of the color reference table 201 included in the clapper board 200 into digital values as described with reference to FIGS. 3 to 5, and then provides the converted digital values to the control unit 611. At this time, when several images are sequentially inputted, the images may be images filmed at different times or filmed by different cameras. In this case, each of the images includes the color reference table 210 of the clapper board 200 in accordance with the embodiment of the present invention. As described above, the color information of the color reference table 210 is converted into digital values to be provided to the control unit 611.

The display unit 603 is configured to display the image provided from the first memory unit 605 or the action image inputted from the image separation unit 602.

A color memory unit 612 includes the reference color information of the color reference table 210 included in the clapper board 200 in accordance with the embodiment of the present invention. In the following descriptions, the reference color information refers to information obtained by mapping the color information of the color reference table as shown in FIGS. 3 to 5. That is, the reference color information does not indicate information on the colors of images filmed by cameras using lightings, but indicates information on original colors. Furthermore, the color memory unit 612 includes an area configured to store a look-up table which may be generated for color conversion by the control unit 611.

An input unit 613 is an input interface device for a user, and includes a variety of devices such as keyboard, mouse, joystick, and touch screen, through which information desired by the user may be inputted.

The control unit 611 is configured to control the color conversion of the images stored in the first memory unit 605, based on the information inputted from the input unit 613. That is, when the color data extraction unit 604 provides the color information corresponding to the respective colors of the color reference table 210 included in the clapper board 200 as digital information, the control unit 611 checks a change degree between the digital information and the reference value inputted from the color memory unit 612. When a color change value depending on a condition desired by a user is additionally inputted, the control unit 611 applies the corresponding color conversion value to generate a look-up table for the color conversion.

Now, the generation of the look-up table performed by the control unit 611 will be described in more detail. As described above, the look-up table has three-dimensional color conversion values as shown in FIGS. 3 to 5. Here, a calculation process in which the coordinate conversion of images is performed using a look-up table generated in the CIE 1976 L*a*b color space will be described in detail as follows.

The look-up table used for the coordinate conversion may be generated by applying a method in which the scale of the L* axis is set different from those of the a*b* axes in order to increase the precision of gray scale. Alternatively, the look-up table may be generated by applying the same scale to the three L*, a*, and b* axes.

The look-up table generated by the control unit 611 may be stored in the color memory unit 612 and is provided to an image conversion unit 606.

The image conversion unit 606 converts the color coordinates of the action images stored in the first memory unit 605 on the basis of the look-up table provided from the control unit 611 such that the colors of the action images are converted into desired colors.

The conversion of the image conversion unit 606 may be described in more detail as follows. First, the RBG information of pixels for an action image stored in the first memory 605 is sequentially read, and a position on the look-up table corresponding to the RGB information of each pixel is then calculated by a trilinear interpolation method. Next, a CIE 1976 L*a*b* value stored at the position on the look-up table corresponding to the pixel RGB value of the action image calculated by the above-described method is read from a look-up table generated from color measurement data. Then, color space conversion is performed to convert the CIE 1976 L*a*b* value read from the look-up table into an RGB color value used in a monitor.

As the above-described process is performed on all the pixels of the inputted image, the coordinate conversion of the filmed image is completed.

The image converted by the image conversion unit 606 is stored in the converted image storage unit 607.

Figure 7:
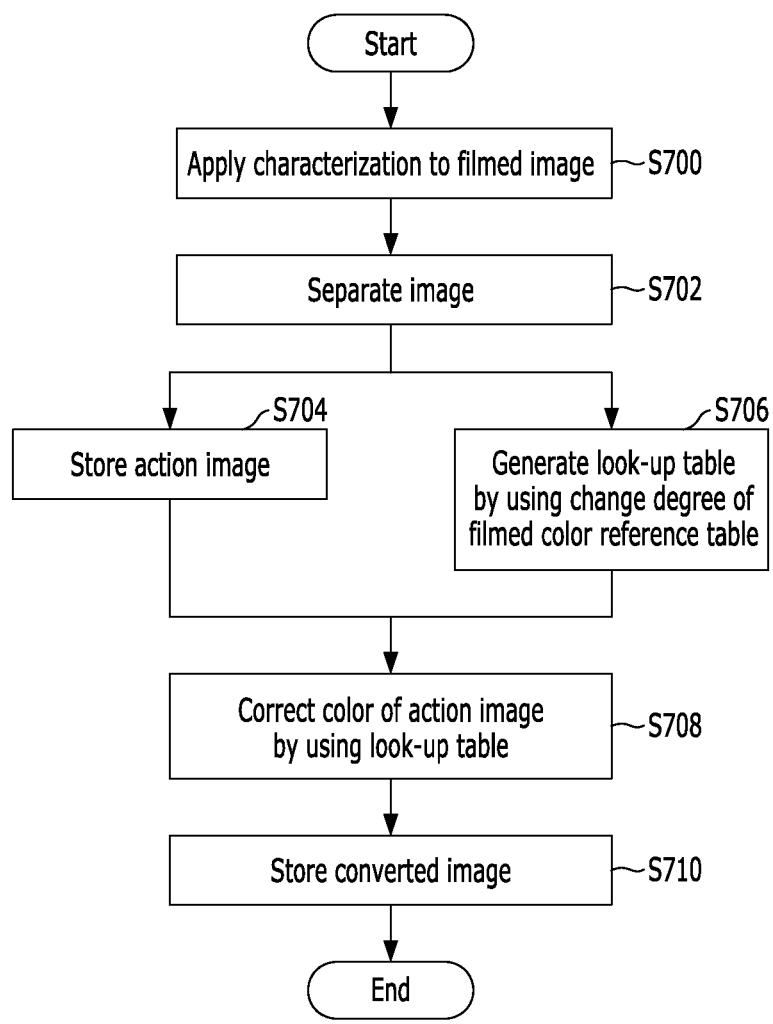
FIG. 7 is a flow chart showing a color conversion method in accordance with another embodiment of the present invention.

FIG. 7 is a flow chart showing the color correction process of the color conversion system in accordance with the embodiment of the present invention. Hereafter, the color correction process in accordance with the embodiment of the present invention will be described with reference to FIGS. 6 and 7.

At step S700, the color characterization application unit 601 applies a color characteristic to a filmed and inputted image. At step S702, the image to which the color characteristic is applied by the color characterization application unit 601 is inputted to the image separation unit 602. At step S704, an action image between the images separated by the image separation unit 602 is stored in the first memory unit 605. At step S706, the control unit 611 generates a look-up table for color correction on the basis of the change degree of the color reference table 210 included in a reference image between the separated images and information inputted by a user. The generated look-up table is provided to the image conversion unit 606.

At step S708, the image conversion unit 606 performs the color correction by using the look-up table for correcting the color of the action image stored in the first memory 605. At step S710, the image of which the color is corrected is stored in the converted image storage unit 607.

The above-described color conversion system and method in accordance with the embodiments of the present invention may be summarized as follows.

When the filming of each scene begins, the reference colors of the color reference table are first filmed, and an action scene is then filmed. The filmed image is stored in a computer of a studio. The stored image is then separated into a reference image and an action image. Subsequently, the reference image and the action image are displayed on a monitor screen, and conversion information desired by a user may be provided to generate color information. Alternatively, the changing color information of a reference image B of an image filmed at a point of time B is generated on the basis of a reference image A of an image filmed at a point of time A.

When the reference image coinciding with the selected color information is extracted from a reference image database and then displayed, color data coinciding with the color reference image is extracted from a color measurement data storage unit.

After the color data is extracted from the color measurement data storage unit, a three-dimensional look-up table is generated. Furthermore, a three-dimensional look-up table is generated for color data extracted from the reference image data database is generated in the same manner. Then, CIE 1976 L*a*b* values for the corresponding coordinates of the two look-up tables for pixels of the action image are calculated by the trilinear interpolation method.

The method of generating a look-up table from color measurement data is performed as follows. First, an average of RGB values is calculated for each pixel of the color measurement data, and then converted into the CIE 1976 L*a*b* color space. Using the converted L*a*b* values, the look-up table is filled out as shown in FIG. 5. At this time, a value corresponding to one point of the look-up table is stored as the 1976 L*a*b* value of the pixel.

Among the calculated values, the CIE 1976 L*a*b* value calculated by using the look-up table generated by the color measurement data storage unit is converted into RGB value used in a monitor. Then, the color is converted into a color desired by a user.

Figure 8:
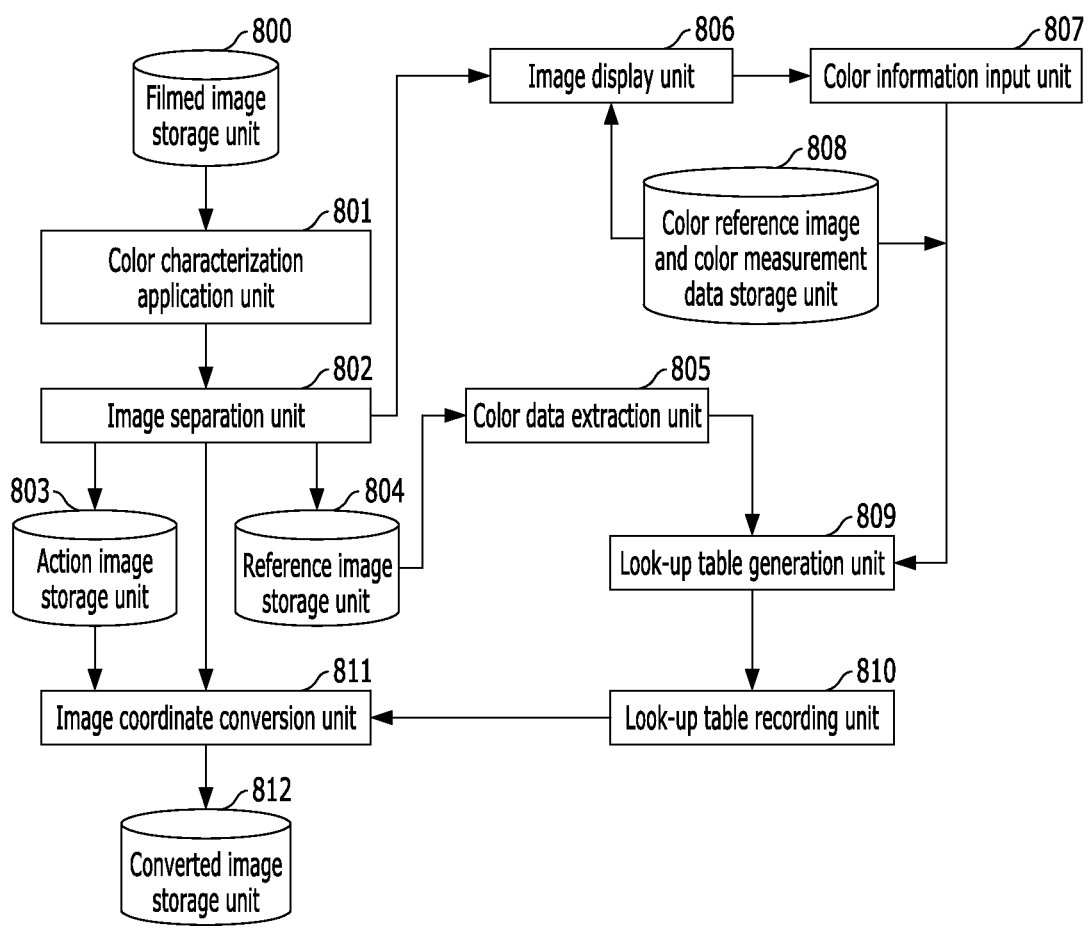
FIG. 8 is a configuration diagram of a color conversion system in accordance with another embodiment of the present invention.

FIG. 8 is a configuration diagram of a color conversion system in accordance with another embodiment of the present invention.

Referring to FIG. 8, a filmed image storage unit 800 is configured to receive the filmed image of FIG. 6. A color characterization application unit 801 corresponds to the color characterization application unit 601 of FIG. 6. An image separation unit 802 corresponds to the image separation unit 602 of FIG. 6. The image separation unit 802 is configured to provide an action image to an action image storage unit 803 configured to store action images. A reference image storage unit 804 is configured to temporarily store a reference image. An image display unit 806 corresponds to the display unit of FIG. 6. A color data extraction unit 805 corresponds to the color data extraction unit of FIG. 6. A color reference image and color measurement data storage unit 808 corresponds to the control unit 611 and the color memory unit 612. A color information input unit 807 corresponds to the user input unit 613, and a look-up table generation unit 809 may be considered to be a function block of the control unit 611 of FIG. 6. A look-up table recording unit 810 corresponds to a partial area of the above-described color memory unit 612. An image coordinate conversion unit 811 corresponds to the image conversion unit 606, and a converted image storage unit 812 corresponds to the converted image storage unit 607 of FIG. 6.

The system configuration of FIG. 8 may be checked from the above-described correspondence relationship. Therefore, the detailed descriptions of the system configuration will omitted herein.

In accordance with the exemplary embodiments of the present invention, the correction of images filmed by cameras may be easily performed, and images filmed at different times on different days may be corrected into an image filmed at the same day. Since the images are easily corrected, it is possible to shorten the time required for the correction. Furthermore, it is possible to reduce a correction cost.

While the present invention has been described with respect to the specific embodiments, it will be apparent to those skilled in the art that various changes and modifications may be made without departing from the spirit and scope of the invention as defined in the following claims.

What is claimed is:

1. A color conversion system which converts the color of a filmed image, comprising:
    an image separation unit configured to receive a reference image including a color reference table and an action image, and separate the reference image and the action image from each other;
    a color data extraction unit configured to output color values of the color reference table included in the reference image;
    a control unit configured to detect change values obtained by comparing the color values of the color reference table included in the reference image with previously-provided original color values, and generate a three-dimensional (3D) look-up table using the detected change values in CIELab color space; and
    an image conversion unit configured to perform color correction by converting the color values of the action image into coordinates in pixels, using the 3D look-up table outputted from the control unit.

2. The color conversion system of claim 1, further comprising a color memory unit configured to store the previously-provided original color values which are to be provided to the control unit.

3. The color conversion system of claim 1, further comprising an input unit configured to receive request information for the color conversion from a user, and provide the request information to the control unit.

4. The color conversion system of claim 1, further comprising a color characterization application unit configured to previously correct the color of the action image depending on the characteristic of a camera filming the image or the display characteristic of the action image, and provide the corrected image to the image separation unit.

5. The color conversion system of claim 4, wherein when action images filmed by two or more cameras are inputted, the color characterization application unit sets one of the action images to the reference image, and corrects the colors of the other action images into the color of the reference image.

6. The color conversion system of claim 1, further comprising a converted image storage unit configured to store the image of which the color is corrected by the image conversion unit.

7. A color conversion method for converting the color of a filmed image, comprising:
    receiving a reference image including a color reference table and an action image, and separating the reference image and the action image from each other;
    outputting color values of the color reference table included in the reference image;
    detecting change values obtained by comparing the color values of the color reference table included in the reference image with previously provided original color values;
    generating a three-dimensional (3D) look-up table using the detected change values in CIELab color space; and
    performing color correction by converting the color values of the action image into coordinates in pixels using the 3D look-up table.

8. The color conversion method of claim 7, further comprising displaying the reference image and the action image.

9. The color conversion method of claim 8, further comprising previously correcting the images to remove the display characteristic of a device which displays the images.

10. The color conversion method of claim 7, further comprising displaying the action image of which the color is corrected.

11. The color conversion method of claim 10, further comprising previously correcting the images to remove the display characteristic of a device which displays the images.

12. The color conversion method of claim 7, further comprising storing the action image of which the color is corrected.

13. The color conversion method of claim 7, further comprising storing the 3D look-up table.

* * * * *